July 31, 1928.
V. P. LARSON
MIXING MACHINE
Filed Aug. 7, 1926
1,678,735
2 Sheets-Sheet 1
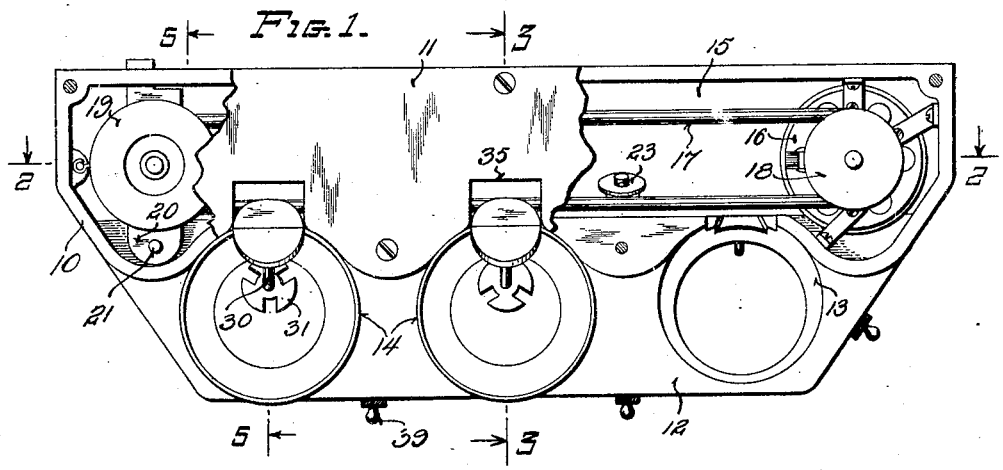
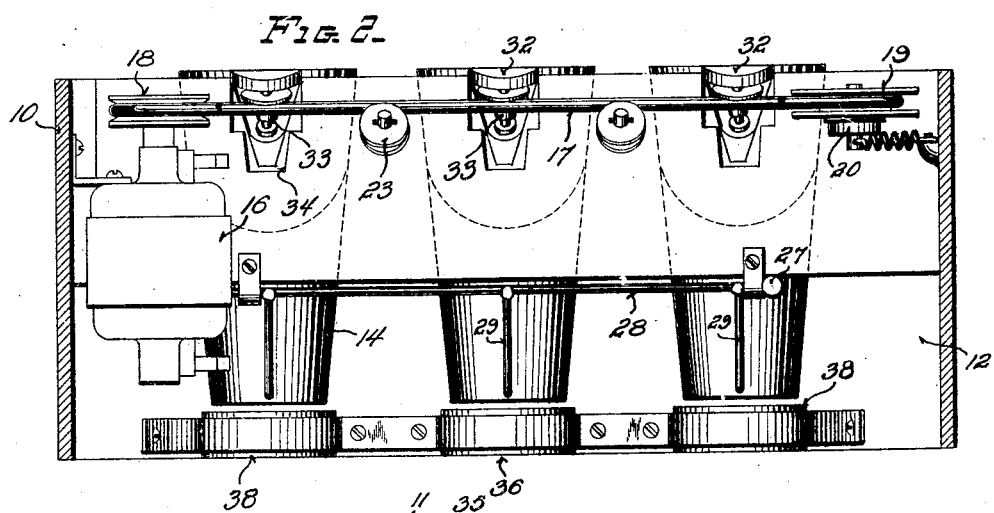
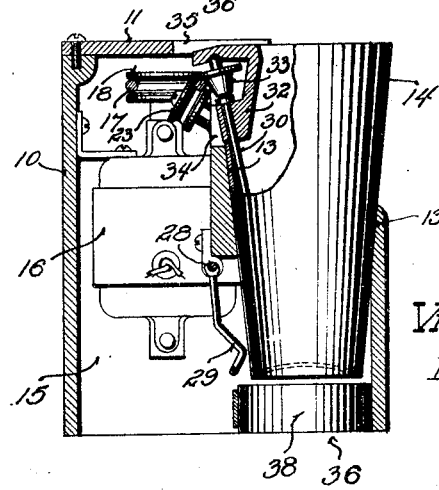
INVENTOR
VICTOR P. LARSON
BY
Ralph L. Brown
ATTORNEY July 31, 1928.
V. P. LARSON
1,678,735
MIXING MACHINE
Filed Aug. 7, 1926    2 Sheets-Sheet 2
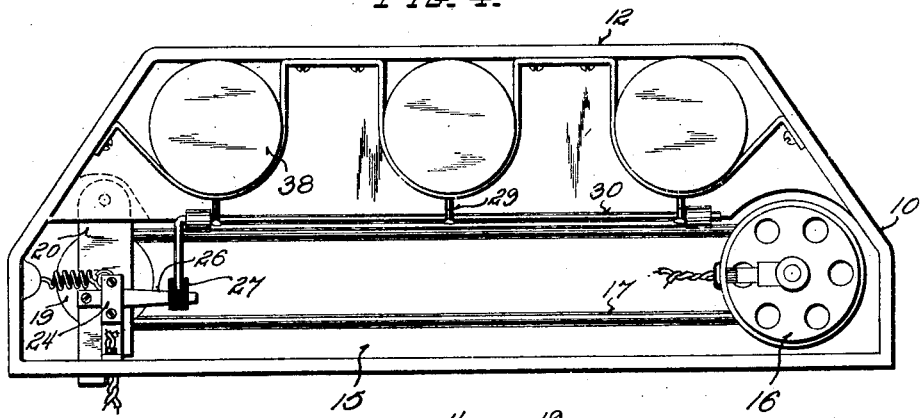
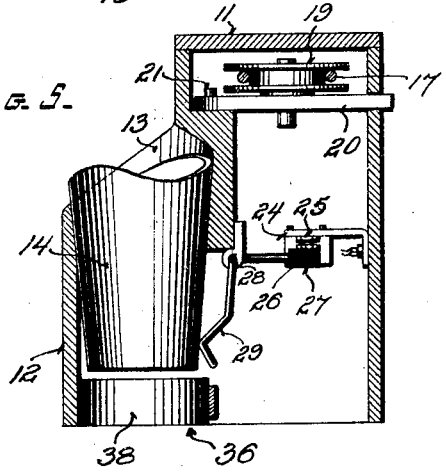
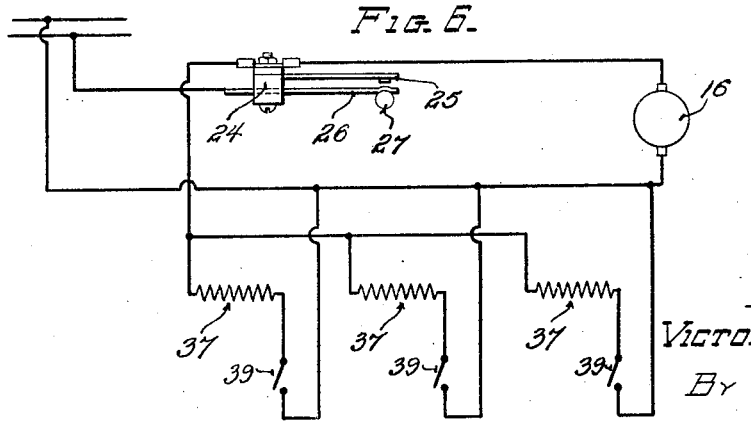
INVENTOR
VICTOR P. LARSON
BY
ATTORNEY Patented July 31, 1928.

1,678,735

UNITED STATES PATENT OFFICE.

VICTOR P. LARSON, OF RACINE, WISCONSIN.

MIXING MACHINE.

Application filed August 7, 1926. Serial No. 127,757.

This invention relates to mixing machines for use in preparing beverages such as malted milk, eggnog, and the like.

In machines heretofore designed for this purpose, the motor is disposed either directly above or beneath the liquid receptacle, and the stirrer or agitator is directly connected, either permanently or removably, to the motor armature shaft. Such arrangements obviously preclude the possibility of mixing more than one beverage in a machine at a time. Furthermore, with the motor disposed above the receptacle, the contents thereof are exposed to oil leakage from the motor, and, with the motor disposed below the receptacle, the driving connection to the stirrer or agitator must be made through the bottom of the receptacle, thus rendering the same liable to leakage. In either of the above types of machines, proper positioning of the receptacle with respect to the motor ordinarily requires some effort and the full attention of the operator, in spite of recent improvements designed to reduce this source of annoyance to a minimum.

The general aim of the present invention is the provision of a machine for the purposes mentioned so constructed and arranged as to avoid the objections above noted.

A more specific object is the provision of a mixing machine by which a plurality of beverages may be mixed at one time.

Another object is the provision in a mixing machine of a simple form of drive mechanism which will permit the motor to be disposed laterally of the receptacle.

Another object is the provision of a drive mechanism of the type just mentioned that will permit ready separation and removal of the stirrer or agitator with the receptacle from the machine, and so designed as to again automatically complete the driving connection by the mere act of reapplying the receptacle to the machine.

Another object is the provision in a multiple mixing machine of receptacle controlled means for rendering the machine active by applying a receptacle thereto in any of the plurality of working positions thereon.

Another object is the provision in a mixing machine of a heating element by which the beverage may be heated during the mixing process.

Other objects and advantages will appear from the following description of an illustrative embodiment of the present invention.

In the drawings:

Figure 1 is a top plan view of a mixing machine constructed in accordance with the present invention. In this figure the cover plate is broken away to disclose hidden parts.

Figure 2 is a longitudinal sectional view taken on the line 2—2 of Figure 1.

Figure 3 is a sectional view taken on the line 3—3 of Figure 1 and serves to illustrate a method of driving the stirring rods in the mixing cups.

Figure 4 is a bottom plan view.

Figure 5 is a transverse sectional view on the line 5—5 of Figure 1, and illustrates the means by which the motor circuit is closed upon the insertion of a mixing cup into the machine.

Figure 6 is a schematic electrical wiring diagram of the circuit used.

The machine selected for illustration comprises a body portion 10, preferably in the form of a housing closed at the top by a removable cover plate 11. The forward portion 12 of the housing shown is perforated as at 13, or otherwise fashioned to provide appropriate individual seats for a plurality of liquid receptacles or mixing cups 14 of well known form. As indicated particularly Figures 3 and 5 the upper portion of the housing is reduced laterally in order to afford easy access to the cups for the purpose of removing and replacing the same. The rear portion 15 of the housing provides an enclosure for the operating parts of the machine, so that they are amply protected against liquids and other foreign substances that might impair the functioning thereof.

In the machine shown an electric motor 16, of any standard or approved design, is firmly supported within one end of the rear portion of the housing 10. An endless drive belt 17, extending lengthwise of the housing, is trained over a pulley 18, fixed to the upper end of the motor armature shaft, and over a pulley 19, rotatably mounted upon a plate 20, preferably adjustably mounted within the other end of the rear portion of the housing. In this instance the plate 20 is rockably supported upon an upright pivot pin 21, and an appropriate spring 22 connected thereto and to the housing urges the same in such direction as to maintain a working tension in the belt 17. As indicated particularly in Figures 1 and 3 the forward run of the belt is disposed adjacent the several seats 13, appropriate guide pulleys 23 being preferably provided to maintain this relation between the belt and seats.

The motor 16 is controlled by a switch 24 of appropriate type preferably placed under the control of mechanism automatically operated by the insertion or removal of a cup into or from any of the seats 13. The switch shown comprises fixed and movable contact members in the form of resilient fingers 25 and 26, respectively, connected in the motor circuit, and preferably disposed within the upper rear portion of the housing. The movable finger 26 is actuated and controlled by an arm 27 fixed to a horizontal rock shaft 28, journaled in the housing and provided with a plurality of trip elements 29. Each element 29 is rigidly fixed to the shaft 28 and projects forwardly into cup engaging position beneath one of the seats 13. The fingers 25 and 26 are normally separated so that the motor circuit is open and the motor at rest, so long as there are no cups in the machine. When a cup is lowered into any of the seats 13, the corresponding trip element 29 is forced rearwardly thereby, causing the shaft 28 to be rocked in such direction as to swing the arm 27 upwardly, to thereby force the movable finger 26 into contact with finger 25. The switch is thus closed, the motor 16 actuated, and the drive belt 17 set in motion. This active condition is maintained, irregardless of additional cups being placed in the machine, until the last cup is removed. The removal of the last cup permits the several trip elements 29 to again assume their normal forwardly projecting positions and the switch opens.

The cups 14 shown are of the usual form preferably tapered toward the bottom so as to facilitate entry thereof into the seats 13. Each carries a stirrer or agitator including the usual rod 30 and button 31. Each agitator is provided with a driving element adapted for coaction with the driving mechanism within the housing, and so designed as to automatically complete a driving connection therewith upon insertion of the cup in any of the seats. In this instance the rod 30 is journaled in a bearing element 32 disposed in the wall of the cup preferably immediately below the rim thereof. The driving element shown comprises a cone shaped pulley 33 fixed to the rod and presenting a driving surface inclined from the vertical so as to insure contact with the driving belt upon lowering the cup into the seat. The pulley is also preferably flanged or otherwise fashioned to insure engagement with the belt. The upper forward portion of the housing 10 and the forward portion of the cover plate 11 are cut away adjacent each seat 13, as indicated at 34 and 35, respectively, to accommodate the pulley 33 and to render the belt accessible thereto.

The machine shown is also equipped with means, under the control of the operator, for heating the contents of any cup during the mixing operation, whenever desired to produce a hot beverage. To this end a plurality of heating elements 36 are mounted in the bottom of the housing 10, each disposed beneath one of the seats 13. Each element comprises a conventional form of electrical resistance unit 37 housed in an appropriate container 38. Each unit is controlled by a push button switch 39 conveniently disposed in the front wall of the housing. As indicated in Figure 6, the several heat units are preferably connected in parallel with each other within the motor circuit, so that the group of units is placed under the control of the main switch 24 and the individual units under the separate control of the several switches 39. It is thus possible, so long as the motor circuit is closed, to render any of the units active by closing the corresponding individual switch, but any such unit is automatically rendered inactive whenever the motor circuit is broken by the removal of the last cup from the machine.

Various changes may be made in the embodiment of the invention hereinabove specifically described without departing from or sacrificing any of the advantages of the invention as defined in the appended claims.

I claim:—

1. In a mixing machine the combination of a body portion having means for removably receiving a plurality of mixing cups, a plurality of cups, a stirring mechanism carried by each cup, a motor supported by said body portion, means actuated by said motor for driving said stirring mechanisms, and means responsive to the application of a cup to any of said receiving means for rendering said motor and driving means active.

2. In a mixing machine the combination of a body portion having means for removably receiving a plurality of mixing cups, a plurality of cups, a stirring mechanism carried by each cup, driving means, and means for automatically effecting a driving connection between said driving means and any of said stirring mechanisms by the application of the corresponding cup to one of said cup receiving means.

3. In a mixing machine the combination of a body portion having means for receiving a plurality of mixing cups, a plurality of cups, stirring mechanism carried by each cup, an endless belt supported by said body portion, means for driving said belt, and a pulley for each stirring mechanism disposed for driving engagement with said belt when the corresponding cup is applied to one of said cup receiving means.

4. In a mixing machine the combination of a body portion having means for receiving a plurality of mixing cups, a plurality of mixing cups, a stirring mechanism for each cup including a driving pulley, and driving means for said several pulleys including means engageable with said pulleys by the application of said cups to said receiving means.

5. The combination with a cup for use in a mixing machine of the character described, of a stirring mechanism carried by said cup, and a driving pulley for said mechanism having a driving surface inclined relative to the axis of said cup and projecting beyond the wall thereof.

6. The combination with a cup for use in a mixing machine of the character described, of a stirring mechanism carried by said cup, said mechanism including a driving element projecting beyond the side of said cup.

7. The combination with a cup for use in a mixing machine of the character described, of a stirring mechanism carried by said cup, and means operable through the side of said cup for driving said mechanism.

8. In a mixing machine the combination of a housing having a plurality of cup receiving sockets, a plurality of cups, a stirring mechanism carried by each cup, a motor in said housing, and driving means actuated by said motor and engageable with said stirring mechanism by the application of said cups to said sockets.

9. In a mixing machine the combination of a housing having a socket for removably receiving a mixing cup, a mixing cup, stirring mechanism carried by said cup, a motor within said housing laterally disposed with respect to said socket, and means actuated by said motor engageable with said stirring mechanism to drive the same when said cup is applied to said socket.

10. In a mixing machine the combination of a housing having an opening for removably receiving a mixing cup, a cup adapted to be seated in said opening, stirring mechanism carried by said cup, a motor within said housing laterally disposed with respect to said opening, and means within said housing actuated by said motor engageable with said stirring mechanism to drive the same when said cup is seated in said opening.

11. In a mixing machine the combination of a housing having an opening for removably receiving a mixing cup, a cup adapted to be seated in said opening, stirring mechanism carried by said cup, a motor within said housing, a switch in said housing for controlling said motor, means actuated by said motor and engageable with said stirring mechanism to drive the same, and cup controlled means for controlling said switch.

12. In a mixing machine the combination of a body portion having a plurality of cup receiving means, a motor carried by said body portion, a switch for controlling said motor, a stirring mechanism for each cup, means actuated by said motor for driving said stirring mechanisms, and means automatically operated by the application of a cup to any of said cup receiving means for closing said switch.

13. In a mixing machine the combination of a body portion having a plurality of cup receiving sockets, a plurality of cups, driving means, and a stirring mechanism carried by each cup and movable into driving engagement with said means by insertion of the cup into one of said sockets.

In witness whereof, I hereunto subscribe my name this 19 day of July, 1926.

VICTOR P. LARSON.